United States Patent
Kennedy et al.

(10) Patent No.: US 12,336,661 B2
(45) Date of Patent: Jun. 24, 2025

(54) COMBINED AIR FRYER AND PRESSURE COOKER LID

(71) Applicant: Sunbeam Products, Inc., Boca Raton, FL (US)

(72) Inventors: William Michael Kennedy, Wellington, FL (US); Eddy Fung, Kowloon Bay (HK); K K Siu, Ma On Shan (HK); Sam Ho, Kowloon Bay (HK); Samuel But, Shatin (HK)

(73) Assignee: Sunbeam Products, Inc., Atlanta, GA (US)

( * ) Notice: Subject to any disclaimer, the term of this patent is extended or adjusted under 35 U.S.C. 154(b) by 0 days.

(21) Appl. No.: 18/174,869

(22) Filed: Feb. 27, 2023

(65) Prior Publication Data

US 2023/0200584 A1 Jun. 29, 2023

Related U.S. Application Data

(63) Continuation of application No. 16/915,441, filed on Jun. 29, 2020, and a continuation of application No. 16/827,213, filed on Mar. 23, 2020, now abandoned.

(60) Provisional application No. 62/869,804, filed on Jul. 2, 2019.

(51) Int. Cl.
*A47J 27/08* (2006.01)
*A47J 27/086* (2006.01)
*A47J 37/06* (2006.01)
*A47J 37/12* (2006.01)

(52) U.S. Cl.
CPC ............. *A47J 37/128* (2013.01); *A47J 27/08* (2013.01); *A47J 27/0802* (2013.01); *A47J 27/086* (2013.01); *A47J 37/0641* (2013.01)

(58) Field of Classification Search
CPC ...... A47J 27/086; A47J 27/08; A47J 27/0806; A47J 27/0815; A47J 37/0641; A47J 37/128; A47J 37/0754; A47J 27/0802
See application file for complete search history.

(56) References Cited

U.S. PATENT DOCUMENTS

| | | | |
|---|---|---|---|
| 1,412,590 | A | 4/1922 | Adelmann |
| 1,907,528 | A | 5/1933 | Evans |

(Continued)

FOREIGN PATENT DOCUMENTS

| | | |
|---|---|---|
| CN | 109393957 A | 3/2019 |
| CN | 208610644 U | 3/2019 |

(Continued)

*Primary Examiner* — Reginald Alexander
(74) *Attorney, Agent, or Firm* — Husch Blackwell LLP

(57) ABSTRACT

The present invention provides a combination pressure cooker and air fryer lid that may be selectively coupled to a vessel. When the lid and the vessel are coupled, the lid may be adjustable between two positions. In the first position, the lid may be used for pressure cooking. In the second position, the lid may be used for air frying. To transition the lid from the first position to the second position, a handle on the lid may be rotated in a particular direction. Conversely, to transition the lid from the second position to the first position, the handle on the lid may be rotated in an opposite direction. Advantageously, in performing either of the pressure cooking or air fryer cooking functions, the lid need not be replaced.

20 Claims, 9 Drawing Sheets

(56) References Cited

U.S. PATENT DOCUMENTS

| | | | | |
|---|---|---|---|---|
| 2,368,795 | A | * | 2/1945 | Wittenberg ......... A47J 27/0806 |
| | | | | 220/759 |
| 2,491,144 | A | * | 12/1949 | Yankovitch ........... A47J 27/092 |
| | | | | 220/301 |
| 2,523,796 | A | | 9/1950 | Weeks |
| 2,751,901 | A | | 6/1956 | Livermore |
| 3,362,566 | A | | 1/1968 | Hanania |
| 5,695,668 | A | | 12/1997 | Boddy |
| 5,699,722 | A | | 12/1997 | Erickson et al. |
| 6,089,145 | A | | 7/2000 | Watson |
| 8,006,685 | B2 | | 8/2011 | Bolton et al. |
| 8,042,532 | B2 | | 10/2011 | Kaneko et al. |
| 9,872,582 | B2 | * | 1/2018 | Song ....................... A47J 27/08 |
| 2005/0166908 | A1 | | 8/2005 | Cartigny et al. |
| 2014/0339223 | A1 | * | 11/2014 | Backaert ............... A47J 27/088 |
| | | | | 219/734 |
| 2018/0035842 | A1 | | 2/2018 | Stumphauzer et al. |
| 2019/0231142 | A1 | | 8/2019 | Gill et al. |
| 2020/0128996 | A1 | * | 4/2020 | Qin ......................... A47J 27/09 |
| 2020/0260902 | A1 | * | 8/2020 | Nam .................. A47J 27/086 |
| 2020/0352384 | A1 | * | 11/2020 | Houjun ................ A47J 27/086 |
| 2021/0038012 | A1 | * | 2/2021 | Huang .................. A47J 27/086 |
| 2021/0045569 | A1 | | 2/2021 | Huang et al. |
| 2022/0117439 | A1 | * | 4/2022 | Mo ......................... A47J 27/09 |
| 2022/0175171 | A1 | * | 6/2022 | Lu .......................... A47J 36/32 |

FOREIGN PATENT DOCUMENTS

| | | |
|---|---|---|
| CN | 109662616 A | 4/2019 |
| DE | 896409 | 11/1953 |
| FR | 2816491 A1 | 5/2002 |
| JP | 2012115486 A | 6/2012 |

* cited by examiner

COMBINED AIR FRYER AND PRESSURE COOKER LID

CROSS-REFERENCE TO RELATED APPLICATIONS

This Application is a continuation of U.S. patent application Ser. No. 16/827,213, filed on Mar. 23, 2020, entitled "Combined Air Fryer and Slow Cooker Lid," currently pending, and U.S. patent application Ser. No. 16/915,441, filed on Jun. 29, 2020, entitled "Combined Air Fryer and Pressure Cooker Lid," currently pending, both of which claim priority to U.S. Provisional Patent Application Ser. No. 62/869,804, filed on Jul. 2, 2019, entitled "Combined Air Fryer and Slow Cooker with a Single Lid," the entire disclosures of which are incorporated herein by reference.

FIELD OF THE INVENTION

The invention refers to a kitchen appliance. More specifically, this invention refers to a kitchen appliance that may be used as either a pressure cooker or air fryer, and includes a single vessel and lid.

BACKGROUND OF THE INVENTION

Many consumers keep a wide variety of kitchen appliances that are tailored to carry out particular cooking functions. For example, many consumers have pressure cookers that can be used to steam or cook food in liquid. Such pressure cookers may substantially reduce cook time.

Consumers also may utilize deep fryers or air fryers to make foods such as potato chips, fried chicken, fish, French fries, or pastries. However, air fryers usually use 70-80% less oil than a traditional deep fryer and are thought of as more healthy. As a result, air fryers have become more commonplace in homes over the past several years.

Many consumers view both pressure cookers and air fryers as necessary appliances due to their usefulness and effectiveness. However, both appliances require storage space when not in use. Given the number of other appliances that a consumer may employ and store (e.g., blenders, food processors, hand and stand mixers, rice cookers), kitchens quickly run out of storage space. As a result, consumers may struggle to find storage space for pressure cookers and air fryers.

Because pressure cooking requires an airtight seal between a lid and vessel, and air frying requires airflow between the lid and vessel and ambient air, it is quite difficult for a single appliance to perform both functions. Current "solutions" to this issue on the market make use of two separate lids that can be used with the same vessel. The first lid can perform pressure cooking functions, while the second lid can perform air frying functions. However, this "solution" defeats the purpose of providing an appliance that can perform both functions since a consumer would need to store each of the two lids, which can be quite clumsy and burdensome. In short, storing two lids does not save enough space in the limited storage space most consumers have in their kitchens. It is therefore desirable for a simply constructed appliance to operate as each of a pressure cooker and air fryer, without the need for additional components, such as more than one lid.

SUMMARY OF THE INVENTION

The present invention provides a combination pressure cooker and air fryer lid that may be selectively coupled to a vessel containing a food item. When the lid is decoupled from the vessel, the lid and the vessel may be in an open position. When the lid is coupled to the vessel, the lid may be adjustable between two generally closed positions. In the first closed position, the lid may operate with the vessel as a pressure cooker. In the second closed position, the lid may operate with the vessel as an air fryer. In performing either of the pressure cooking or air frying cooking functions, the lid need not be replaced. For the purposes hereof, it will be understood that discussion of pressure cooking herein is relevant to other conductive cooking processes (e.g., slow cooking, rice cooking, etc.) as well. Similarly, discussion of air frying herein will be understood as being relevant to convective cooking processes in general.

According to one aspect of the present invention, a lid is provided that may selectively attach to a vessel using a variety of known or foreseeable methods and mechanisms. The lid may include a handle proximate to a top end. When the handle is rotated in a first direction, the lid may preferably transition to the first closed position. When the lid is coupled to the vessel and in the first closed position, a central cavity of the vessel may be sealed from the environment. Thus, the lid may be used or configured for pressure cooking in the first closed position.

More particularly, the lid may include a set of threads positioned and located proximate to a second lid end. The set of threads may be configured to engage with threads positioned and located on the vessel. The lid may further include a skirt which extends downwardly from the lid. In the first closed position, the skirt may extend over a portion of a sidewall of the vessel. Thus, the lid and the vessel may lock to establish an air tight seal in the first closed position. As a result, the central cavity of the vessel may be sealed from the ambient environment in an air tight manner. Thus, pressure may accumulate within the central cavity of the vessel to facilitate pressure cooking when the lid is in the first closed position.

When the handle is rotated in a second direction, opposite the first direction, the lid may preferably transition to the second closed position. When the lid is coupled to the vessel and in the second closed position, the lid may be used or configured for air frying. More particularly, an air gap or slot may be defined between the lid and the vessel. The air gap may preferably allow for fluid communication between the central cavity and the ambient environment. Additionally, when the lid is in the second closed position relative to the vessel, electrical contacts on the vessel may engage with electrical contacts on the lid to preferably activate at least one of a fan or a heating element. Accordingly, the lid may facilitate air frying when in the second closed position.

BRIEF DESCRIPTION OF THE DRAWINGS

For a better understanding of the various embodiments of the present invention, reference may be made to the accompanying drawings in which.

Figure 1:
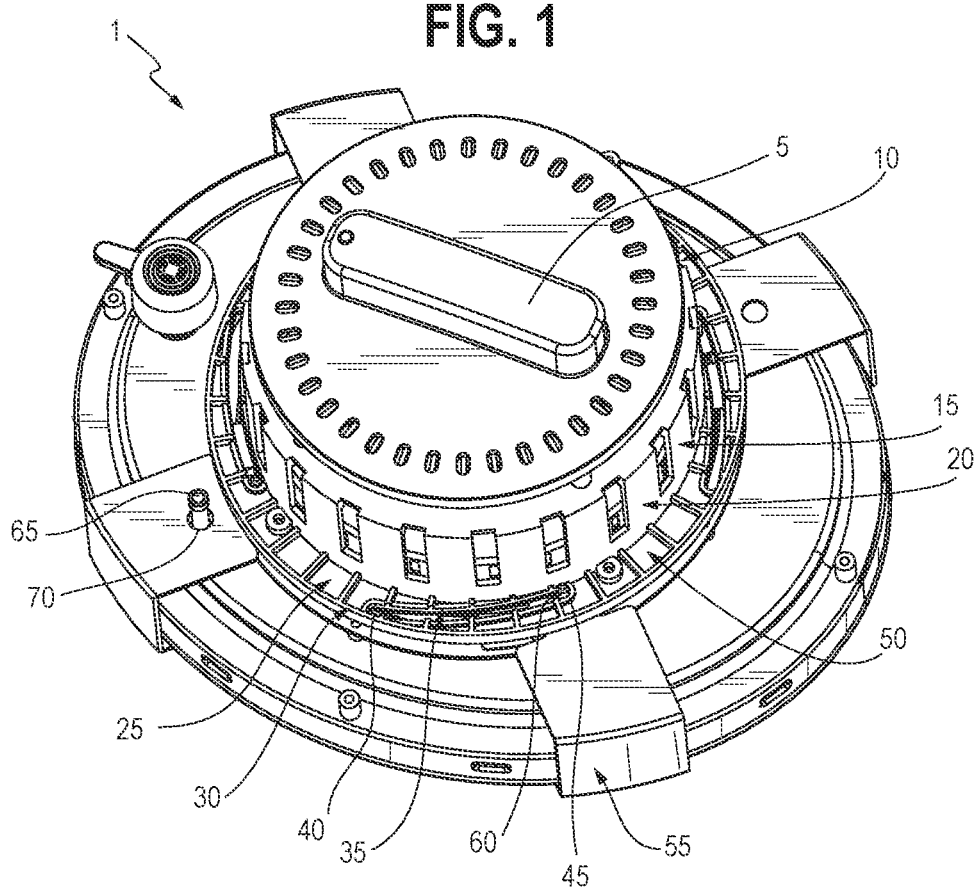
FIG. 1 is a top perspective view of a lid for a combined air fryer and pressure cooker constructed according to the teachings of the present invention with the lid in a first position.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIGS. 1-6 depict a lid member 1 that may be used with a vessel (an example of which is provided in FIG. 7) to perform at least two cooking functions. Such cooking functions may be carried out in association with a number of different types of food products. More particularly, the lid member 1 may be selectively attachable to the vessel, and together they may be used as a pressure cooker or an air fryer. As illustrated in FIG. 1, the lid member 1 is shown without a casing. This is to better illustrate the various mechanical components within the lid member 1. In a preferred embodiment, the lid member 1 may include a casing such as those known in the art that may be made from metal, plastic, or the like to give the lid member 1 a more "finished" appearance. Such a casing is illustrated at least in part in FIG. 7, which is described below in greater detail.

As illustrated in FIG. 1, the lid member 1 preferably includes a handle 5 at an upper portion 10 thereof. The handle 5 is preferably in mechanical connection with a circular dial member 15. In the illustrated embodiment, the dial member 15 is circular, but in alternative embodiments, it may take on different shapes so long as it is able to carry out the functions described herein. Moreover, in some embodiments, the handle 5 may not be included, or the dial member 15 may not be included. Similarly, the handle 5 may be provided in a multitude of shapes or sizes, or it may be provided as an alternative activation member like those known in the art such as a knob, button, or otherwise. In any case, the handle 5 and dial member 15, or their alternatives, act as a transmission to actuate movement such as that described below.

At a lower portion 20 of the dial member 15, a plate member 25 is also in mechanical connection with the handle 5, or may be connected to the handle 5 regardless of the dial member 15. As such, when the handle 5 and/or the dial member 15 are rotated, the plate member 25 is similarly rotated. In at least one embodiment, the handle 5, dial member 15, and plate member 25 may be integrally formed. However, in other embodiments, they may be separately constructed and in mechanical connection with one another via known or foreseeable methods and mechanisms.

Near an outer edge 30 of the plate member 25, the plate member 25 may include a plurality of slot members 35. In the embodiment described herein, the plate member 25 includes four slot members 35. However, in alternative embodiments, more or fewer slot members substantially similar to the slot members 35 may be associated with the plate member 25. The slot members 35 may generally be formed as elongated, slightly curved apertures in the plate member 25.

Each slot member 35 preferably includes each of a first end 40 and a second end 45. In a preferred embodiment, the first end 40 is closer to the outer edge 30 of the plate member 25, while the second end 45 is closer to an inner edge 50 of the plate member 25. Between the first end 40 and the second end 45, the aperture formed by the slot member 35 preferably gets closer to the inner edge 50. This creates a ramping, or cam, effect by the slot members 35.

The lid member 1 also preferably includes a plurality of clamp members 55 located along an outer periphery thereof. The clamp members 55 are preferably C-shaped so that they may clamp the lid member 1 to an upper portion of a vessel. The clamp members 55 may be attached to the plate member 25, or in alternative embodiments, to another portion of the dial member 15. The clamp members 55 are preferably attached to the plate member 25 or the dial member 15 in such a manner that allows the clamp members 55 to translate radially inwardly and outwardly so as to get closer to, and farther from, the vessel. As will be described in greater detail herein below, the clamp members 55 are preferably able to translate inwardly or outwardly as the handle 5 and/or dial member 15 is rotated. In the embodiment illustrated herein, the lid member 1 includes four clamp members 55, the same number as slot members 35 that are provided. However, like the slot members 35, in alternative embodiments, more or fewer clamp members 55 may be provided. In the embodiment described herein, the number of clamp members 55 and the number of slot members 35 should be equal to one another.

A pin 60 that is integrally formed with the clamp member 55 preferably projects upwardly therefrom. In operation, each pin 60 is received within a distinct slot member 35. This is preferably true for each clamp member 55, pin 60, and slot member 35 of the lid member 1. As will be described below, it is the rotation of the dial member 15 and its slot members 35 that act as cams on the pin members 60, and in turn the clamp members 55, to radially translate the clamp members 55 inwardly or outwardly to clamp or unclamp the lid member 1 to the vessel.

Figure 3:
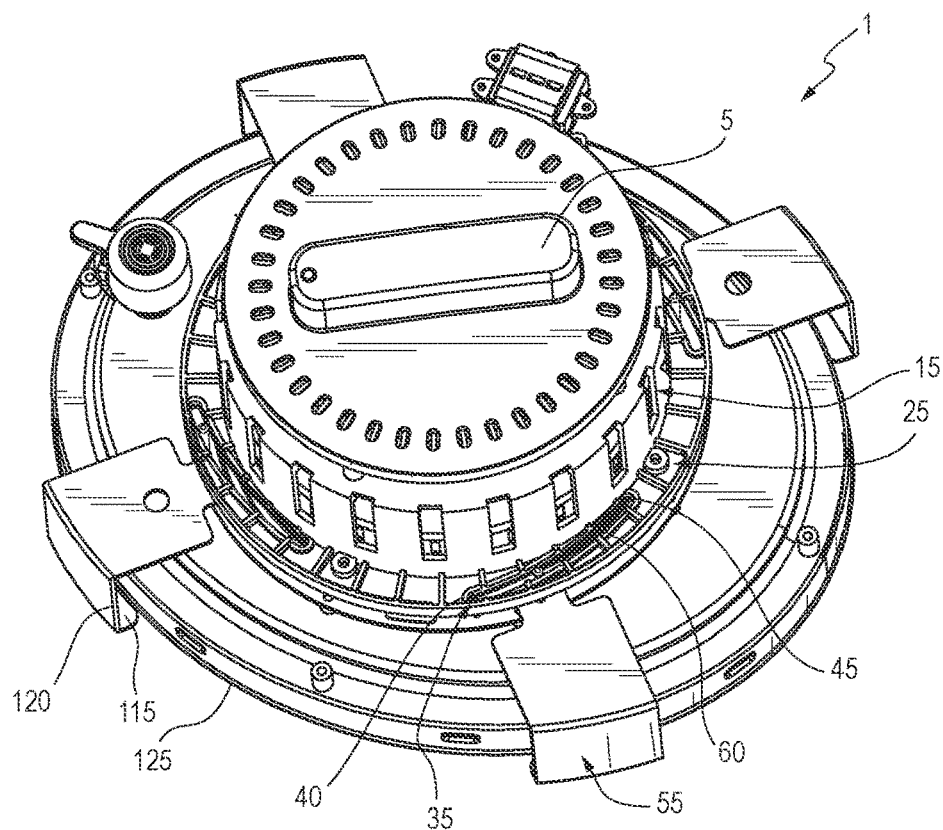
FIG. 3 is a top perspective view of the lid of FIGS. 1 and 2 in a second position.
Figure 5:
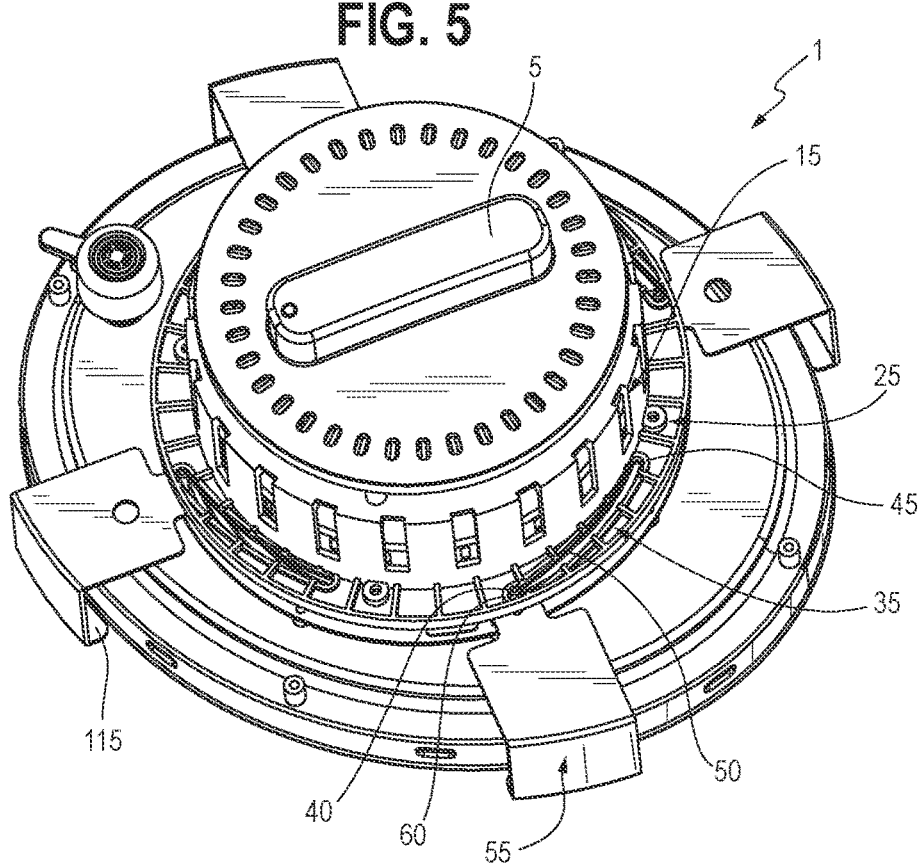
FIG. 5 is a top perspective view of the lid of FIGS. 1-4 in a third position.

With the pin members 60 positioned and located within the slot members 35, rotation of the handle 5, dial member 15, and/or the plate member 25 may cause radial translation of the clamp members 55. As illustrated in FIG. 1, the handle 5, dial member 15, and/or plate member 25 have been rotated completely in the clockwise direction. As such, the pin member 60 is adjacent to the second end 45 of the slot member 35. In this position, when the lid member 1 is set to perform its pressure cooking operations, the clamp members 55 are completely radially translated inwardly to tightly and securely couple the lid member 1 to the vessel. In FIGS. 3 and 5, which are described in greater detail below, the handle 5, dial member 15, and/or plate member 25 has been turned in the counterclockwise direction to put the lid member 1 in a transitional position and air fryer position, respectively.

In the position illustrated in FIG. 1, each of an indicator 65 and a through-hole 70 are also more clearly illustrated. In operation, the indicator 65 is preferably in fluid communication with the inside of the vessel. The indicator 65 is preferably formed as a cylindrical tab that "pops up" when pressure is reached in the vessel. Such pressure may only be produced in the vessel when the lid member 1 works with the vessel to carry out its pressure cooking function. The through-hole 70 is preferably provided in the clamp member 55, and the indicator 65 is preferably mounted below the clamp member 55. When the lid member 1 and the vessel are in the pressure cooking mode, with the handle 5 turned in the completely clockwise direction, and the clamp members 55 drawn inwardly, the indicator 65 may protrude through the through-hole 70 when pressure is reached in the vessel. When in a mode other than pressure cooking mode, the indicator 65 is preferably trapped beneath the clamp member 55.

Figure 2:
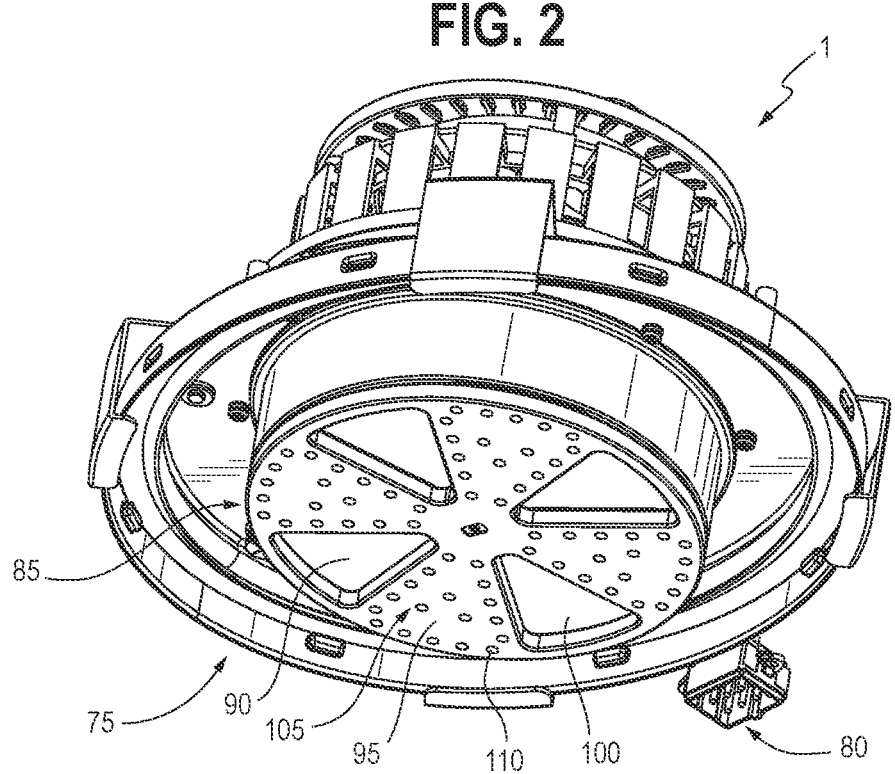
FIG. 2 is a bottom perspective view of the lid of FIG. 1.

FIG. 2 illustrates an underside 75 of the lid member 1 when it is in the pressure cooking position illustrated in FIG. 1 and described above. As illustrated in FIG. 2, when the lid member 1 is in its pressure cooking position, all of the clamp members 55 are radially drawn inwardly to secure the clamp members 55 to the vessel, as described above. FIG. 2 also illustrates an electrical connector member 80 that may mate with electronics of the vessel to power the lid member 1 and its various functions. In alternative embodiments, other known or foreseeable electronic components may be used to power the lid member 1.

As one skilled in the art can appreciate, in order for a lid such as the lid member 1 and a vessel to carry out pressure cooking operations, the vessel should be airtight. As such, in addition to the lid member 1 being securely coupled to the vessel via the clamp members 55, communication between the vessel and the environment must be eliminated. To do so during the pressure cooking process, an internal sealing mechanism 85 may be used. Generally, the internal sealing mechanism 85 may comprise a plurality of panel members 90 in mechanical connection with the handle 5 and a sealing plate 95. The sealing plate 95 preferably includes a plurality of sealing apertures 100 that may be selectively covered by the panel members 90 (as illustrated in FIG. 2) when the lid member 1 is in its pressure cooking operation to keep the vessel airtight.

Figure 6:
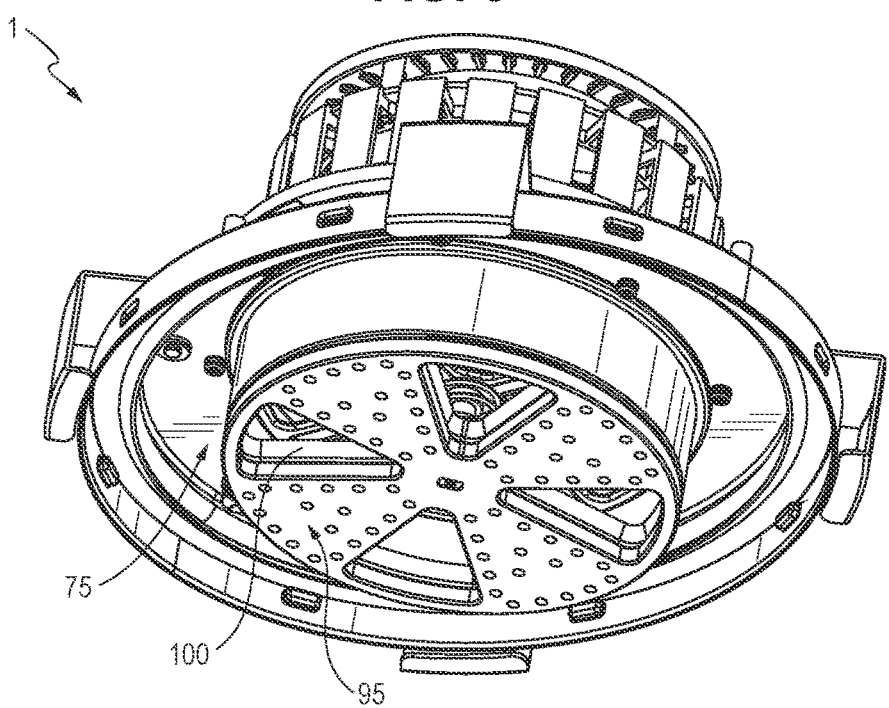
FIG. 6 is a bottom perspective view of the lid of FIGS. 1-5 in the third position.
Figure 7:
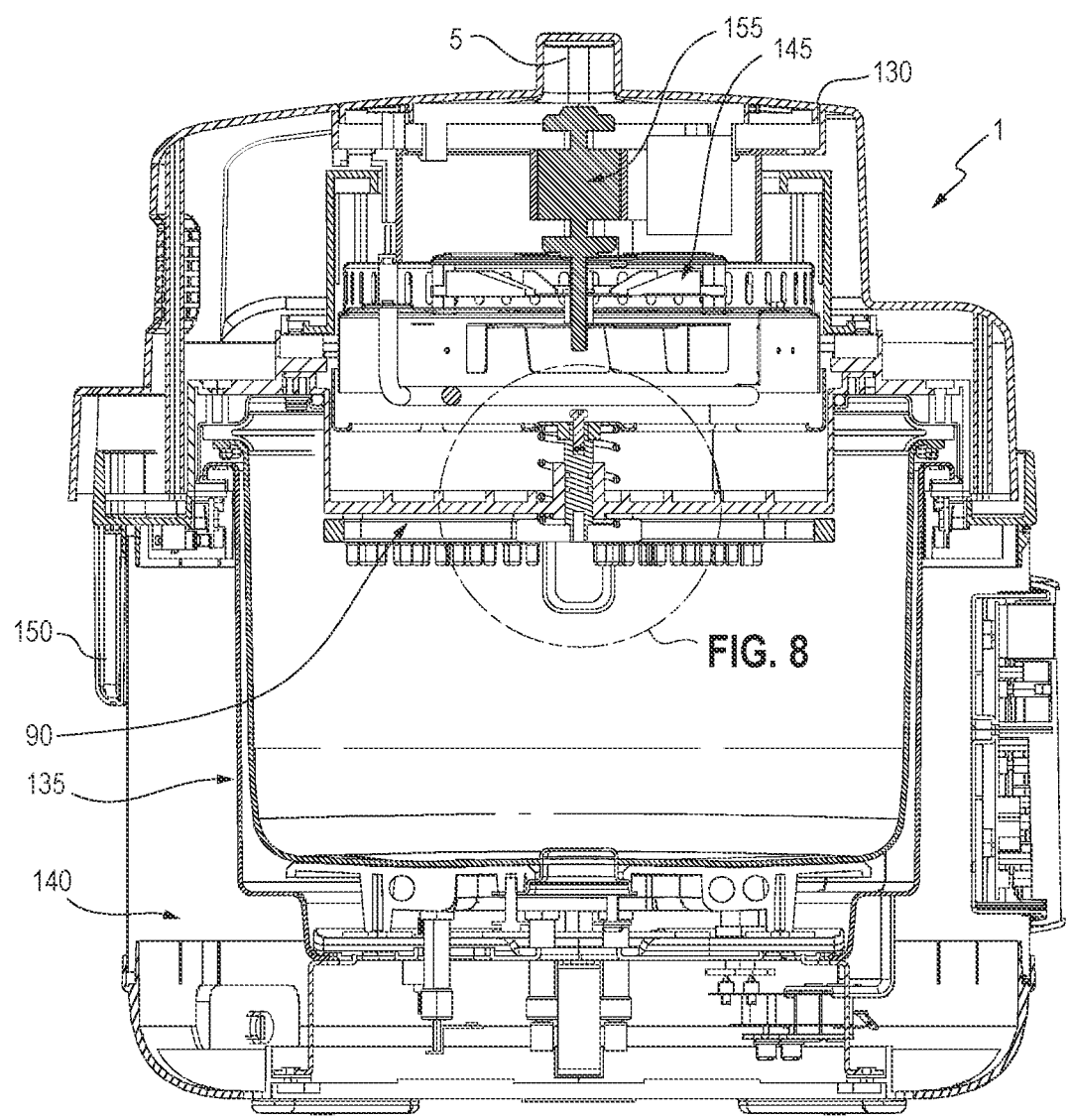
FIG. 7 is a cross-section view of the lid of FIGS. 1-6 and a vessel associated therewith.

As illustrated and described in reference to FIG. 7, the sealing plate 95 is preferably in mechanical connection with the handle 5, for example via a shaft (though any transmission means are foreseeable). The shaft may preferably be upwardly biased by a spring so that without interference by a user, the sealing plate 95 may "auto-locate" to cover its sealing apertures 100 with the plurality of panel members 90. When a user wishes to transition the lid member 1 to an air frying position, the sealing plate 95 may be manipulated as described hereinbelow and illustrated in FIGS. 4 and 6 to dislocate the panel members 90 from its sealing apertures 100 and provide communication via the sealing apertures 100. However, as shown in FIG. 2, when the lid member 1 is in its pressure cooking position, the panel members 90 preferably completely fill and block the apertures 100 to keep the vessel airtight.

A lower face 105 of the sealing plate 95 may be provided with a plurality of nub members 110. The nub members 110 may be small cylindrical projections that extend downwardly from the lower face 105. The nub members 110 may be useful for molding purposes, but are not a critical part of the lid member 1 and may be omitted in certain embodiments.

Turning to FIG. 3, the lid member 1 is shown in a transitional phase between its pressure cooking and air frying positions. More particularly, in FIG. 3, the handle 5 is shown as having been rotated at least partially in the counterclockwise direction. As illustrated, when the handle 5 is rotated in the counterclockwise direction, the plate member 25 with which it is mechanically connected is similarly rotated in the counterclockwise direction. Slot members 35 of the plate member 25 similarly rotate in the counterclockwise direction. As the slot members 35 rotate, due to the curvature of the slot members from their first end 40 to their second end 45, an outward force may be applied on the pin members 60 of the clamp members 55. When such an outward force is applied to the pin members 60, that same force is translated to the clamp members 55. The clamp members 55 thus are translated radially outwardly to at least partially release the clamp members 55 from the vessel.

As illustrated in FIG. 3, a gap 115 may be provided between a downward extension 120 of the clamp member 55 and an outer rim or outer circumference 125 of the lid member 1. When the gap 115 is present, the lid member 1 may be more easily removed from the vessel. While only one transitional position is illustrated where the pin member 60 is approximately halfway between the first and second ends 40, 45 of the slot member 35, it is illustrative of just one example position.

In operation, the handle 5 and the dial member 15 (and plate member 25) may be rotated to a variety of degrees to place the pin 60 at various positions along the length of the slot members 35. Similarly, the clamp members 55 may be positioned near or farther from the outer circumference 125 of the lid member 1 depending on the position of the pin members 60 within the slot members 35 at a number of locations. As illustrated in FIG. 3, the handle 5 has been rotated such that the clamp members 55 have been radially extended outwardly from the lid member 1. In this position, the clamp member 55 including the through-hole 70 has been sufficiently radially translated outwardly to cover the indicator 65 that was previously illustrated and described in FIG. 1.

Figure 4:
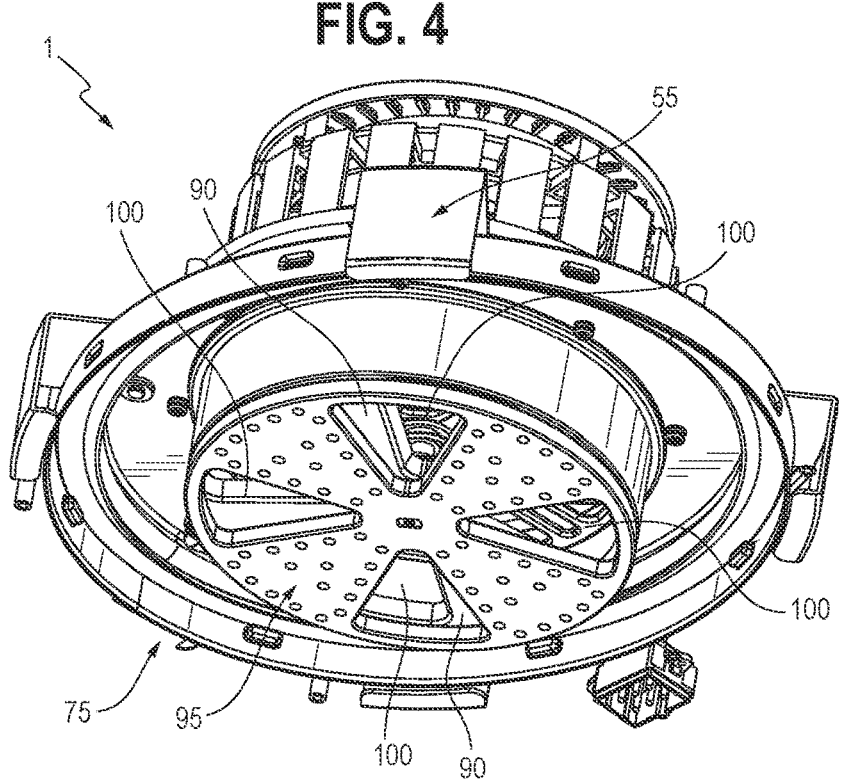
FIG. 4 is a bottom perspective view of the lid of FIGS. 1-3 in the second position.

Turning to FIG. 4, the underside 75 of the lid member 1 is illustrated in greater detail when the lid member 1 is in its transitional position. More particularly, in the transitional position, the handle 5 (or other activation mechanism) has been sufficiently turned as described above to not only cause the clamp members 55 to rotate, but also cause the sealing plate 95 to rotate. With the sealing plate 95 at least partially rotated, a path through at least a portion of the sealing apertures 100 is visible. With the sealing apertures 100 at least somewhat exposed to provide communication between the vessel and the environment via the apertures 100, pressure cooking is no longer possible because the vessel is not airtight.

To transition the sealing plate 95 from a position in which the panel members 90 are seated within the sealing apertures 100 to the position illustrated in FIG. 4, a user may first push downwardly on the handle 5 to overcome the spring bias (described below). Then, with the handle 5 pushed downwardly, a user may rotate the handle 5 and thus the shaft and the sealing plate 95 in the counterclockwise direction to reposition the sealing plate 95.

FIG. 5 illustrates the lid member 1 in its air frying position. In the air frying position, the handle 5 has been rotated farther, or even completely, in the counterclockwise direction. As described above, since the handle 5 has been rotated in the counterclockwise direction, so too have the dial member 15 and/or the plate member 25. Consequently, the slot members 35 have similarly been rotated in the counterclockwise direction. With the handle 5 rotated in the counterclockwise direction, each of the pin members 60 are preferably positioned adjacent the first end 40 of each of the slot members 35. In this position, each slot member 35 is at its greatest distance from the inner edge 50 of the plate member 25. As such, each pin member 60 has been pushed radially outwardly, and if it fully abuts the first end 40, at its maximum radial outward position. Because each pin member 60 has been pushed outwardly, each clamp member 55 similarly has been pushed outwardly such that the size of the gap 115 has increased. This makes the lid member 1 even easier to remove from the vessel, and it further covers the indicator 65.

When the handle 5 is rotated in the manner described above with reference to FIG. 4, the sealing plate 95 may similarly be rotated so that the sealing apertures 100 are substantially clear from and unobstructed by the panel members 90. This position, where the handle 5 is fully rotated in the counterclockwise direction (see FIG. 5) is illustrated in FIG. 6, where the underside 75 of the lid member 1 is more clearly illustrated. With the apertures 100 clear and unobstructed, a fan (illustrated in FIG. 7 and described in association therewith) within the lid member 1 may operate in a known manner to carry out the air frying function.

As described above with reference to FIG. 4, with the handle 5 rotated sufficiently, the spring may again upwardly bias the sealing plate 95 upwardly on an lower side of the panel members 90. To return the lid member 1 to its pressure cooking position illustrated in FIGS. 1 and 2, the handle 5 may simply be rotated in the clockwise direction so that the various mechanisms described above may take place in the reverse direction. As such, the clamp members 55 may radially translate inwardly, and the sealing plate 95 may rotate such that the panel members 90 cover an increasing portion of the sealing apertures 100 until the handle 5 is fully rotated in the clockwise direction. Once it is in that position, as illustrated in FIGS. 1 and 2, the clamp members 55 may be positioned to clamp the lid member 1 to the vessel, and the panel members 90 may be fully seated within the sealing apertures 100.

FIG. 7 illustrates the lid member 1, including a casing 130 to better cover and conceal the various components that make up the lid member 1 as described above. The casing 130 may take on a number of different forms, but in a preferred embodiment, it may be made of a material such as aluminum or plastic, or a combination thereof, and it should sufficiently cover the various components that are housed within the lid member 1.

Also illustrated in FIG. 7 is a vessel 135 that may be used with the lid member 1 to perform the pressure cooking or air frying functions described above. The illustrated vessel 135 is cylindrical in shape, but in other embodiments, it may take on a number of different shapes including oval, rectangular, or other foreseeable shapes. In any case, the vessel 135 should be configured so that the clamp members 55 of the lid member 1 may be releasably attachable to the vessel 135. The vessel 135 may be positioned and located within a casing 140 that may include a number of components used to perform the pressure cooking or air frying functions of the lid member 1 in combination with the vessel 135. For example, the casing 140 may include a control panel for controlling the functions of the lid member 1 via, for example, the electrical connector member 80, a heating element, and other known or foreseeable components necessary to carry out the functions of the lid member 1 and the vessel 135.

Furthermore, like lid members and vessels known in the art, the lid member 1 and the vessel 135 may include components that help to carry out the pressure cooking or air frying functions of the lid member 1 and the vessel 135. For example, as illustrated in FIG. 7, the lid member 1 may include a fan member 145 that may, in a convection-like manner, blow air heated by a heating element in the lid into the vessel 135 when the lid member 1 is in its air fryer mode. Further, the lid member 1 may be associated with a releasably attachable drip container 150 that is able to catch condensation and other products of pressure or other cooking therein. Other known or foreseeable components that help the lid member 1 and/or the vessel 135 or its casing 140 to carry out the pressure cooking or the air frying functions may be contained therein.

Along a central portion of the lid member 1, a shaft 155 is preferably provided that connects the handle 5 to the sealing plate 95. As such, when the handle 5 is rotated, so too is the shaft 155 and the sealing plate 95 associated therewith. Similarly, when the handle 5 is pushed downwardly, the shaft 155 and the sealing plate 95 is translated downwardly, and when the handle 5 is translated upwardly, the sealing plate 95 is translated upwardly for the same reasons.

Figure 8:
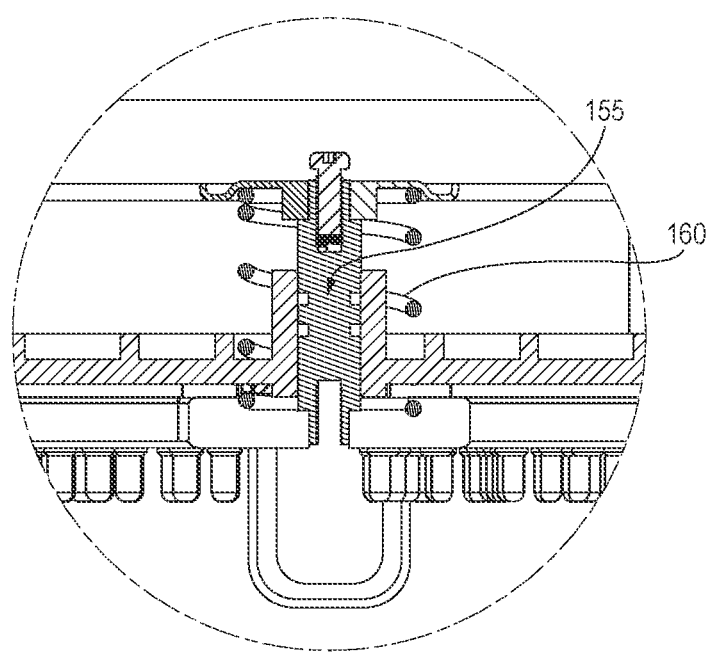
FIG. 8 is an enlarged view of the cross-section view of FIG. 7.

As illustrated in greater detail in FIG. 8, the shaft 155 is preferably provided with a spring member 160 that circumscribes the shaft 155. The spring member 160 preferably exerts a biasing force so that without other outside interference, the sealing plate 95 is biased upwardly, and depending on the position of the handle 5, biased so as to seat the panel members 90 within the sealing apertures 100. Thus, to transition the lid member 1 from its pressure cooking function, where the panel members 90 are seated within the sealing apertures 100, a user must not only rotate the handle 5, but also first push downwardly on the handle 5 so as to overcome the force of the spring member 160 to drop the sealing plate 95 down.

Sensors may also be located in the lid member 1 or the vessel 135 that are able to detect when the lid member 1 is in the pressure cooking or air frying mode. The sensors may be in communication with a microcontroller that may instruct the lid to carry out particular functions associated with pressure cooking or air frying, depending on the position of the handle, user input, or both.

Figure 9:
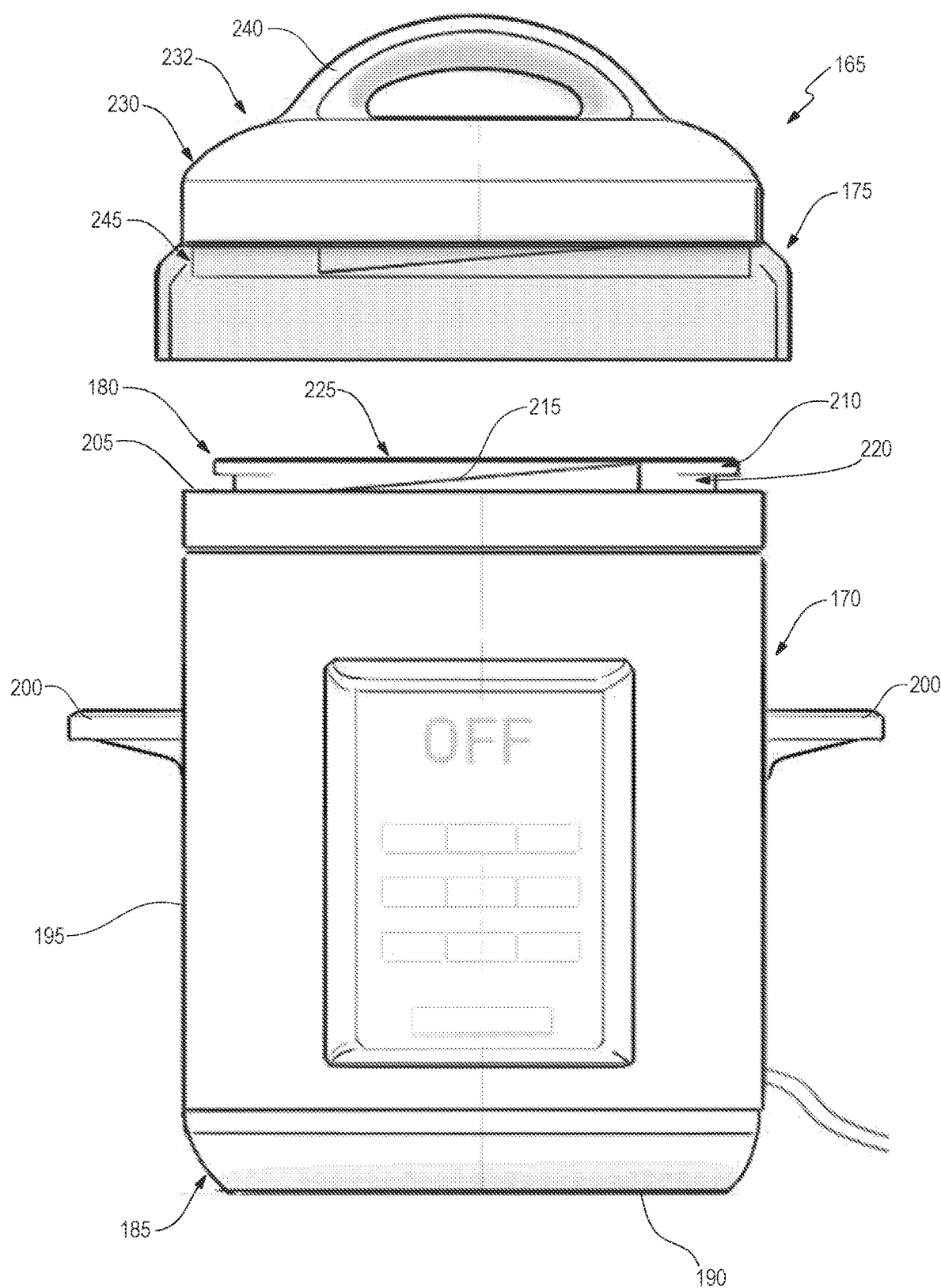
FIG. 9 is a front elevation view of a lid and vessel alternatively constructed according to the teachings of the present invention with the lid in an open position.

Turning to FIG. 9, in another embodiment, an appliance 165 may include a vessel 170 and a lid 175. The appliance 165 may be a combination air fryer and pressure cooker, allowing the user to use the appliance 165 for either air frying or pressure cooking. The lid 175 and the vessel 170 may selectively engage or couple with one another. FIG. 9 illustrates the lid 175 and the vessel 170 disengaged, in an open position.

The vessel 170 may extend from a first vessel end 180 to a second vessel end 185. The vessel 170 may include a vessel base 190 positioned and located at the second vessel end 185. The vessel base 190 may be a substantially planar circular member, although the vessel base 190 may be other shapes (e.g., oval, ellipsoid, rectangle) or non-planar in alternative embodiments.

The vessel 170 may further include a vessel sidewall 195 that circumscribes and projects away from the vessel base 190 towards the first vessel end 180. The vessel sidewall 195 and the vessel base 190 may define a central cavity (not illustrated) of the vessel 170 where the user may place food for air frying or pressure cooking.

The vessel 170 may further include at least one handle 200. In one embodiment, the vessel 170 preferably includes two handles 200. The handles 200 preferably project away from the vessel sidewall 195 in directions opposite from one another. The handles 200 may be C-shaped, although other configurations for the handles 200 (e.g., knob-shaped handles, rectangular-shaped handles) are foreseeable.

A shoulder portion 205 may extend radially inward from the vessel sidewall 195 proximate to the first vessel end 180. The vessel 170 may also include a neck portion 210, which abuts and projects away from the shoulder portion 205. The neck portion 210 is preferably formed as an annular ring, although other shapes for the neck portion 210 are foreseeable. The neck portion 210 may include a first set of threads 215 positioned and located on an outer surface 220 of the neck portion 210. The neck portion 210 may further include an opening 225 at the first vessel end 180. The opening 225 may extend downward through the neck portion 210, and into the central cavity of the vessel 170. Accordingly, the user may place food into the central cavity via the opening 225 in the neck portion 210.

The lid 175 may include a first lid section 230 positioned and located at a first lid end 232. In one embodiment, the first lid section 230 may be a circular planar member with rounded edges at the first lid end 232. The first lid section 230 is preferably shaped and sized so that the lid 175 and vessel 170 may selectively engage with each other. For example, a circumference of the lid 175 may be the same size as or slightly larger than a circumference of the vessel 170.

As further illustrated in FIG. 9, the lid 175 may include a lid handle 240 that is preferably a C-shape or arch shape that projects away from the first lid section 230, although other shapes and configurations are envisioned. The user may use the lid handle 240 to lift the lid 175 or the appliance 165, when the lid 175 and vessel 170 are selectively engaged.

The lid 175 may further include a second lid section 245 positioned and located beneath the first lid section 230, opposite from the lid handle 240. The second lid section 245 is preferably an annular ring or a planar circular section with a smaller circumference than the first lid section 230, but a slightly larger circumference than the neck portion 210 of the vessel 170. An inner surface (not shown) of the second lid section 245 may include a second set of threads or tracks (not shown) that allows the lid 175 to selectively engage with the vessel 170, although other means for engagement (e.g., a friction fit) are foreseeable.

Figure 10:
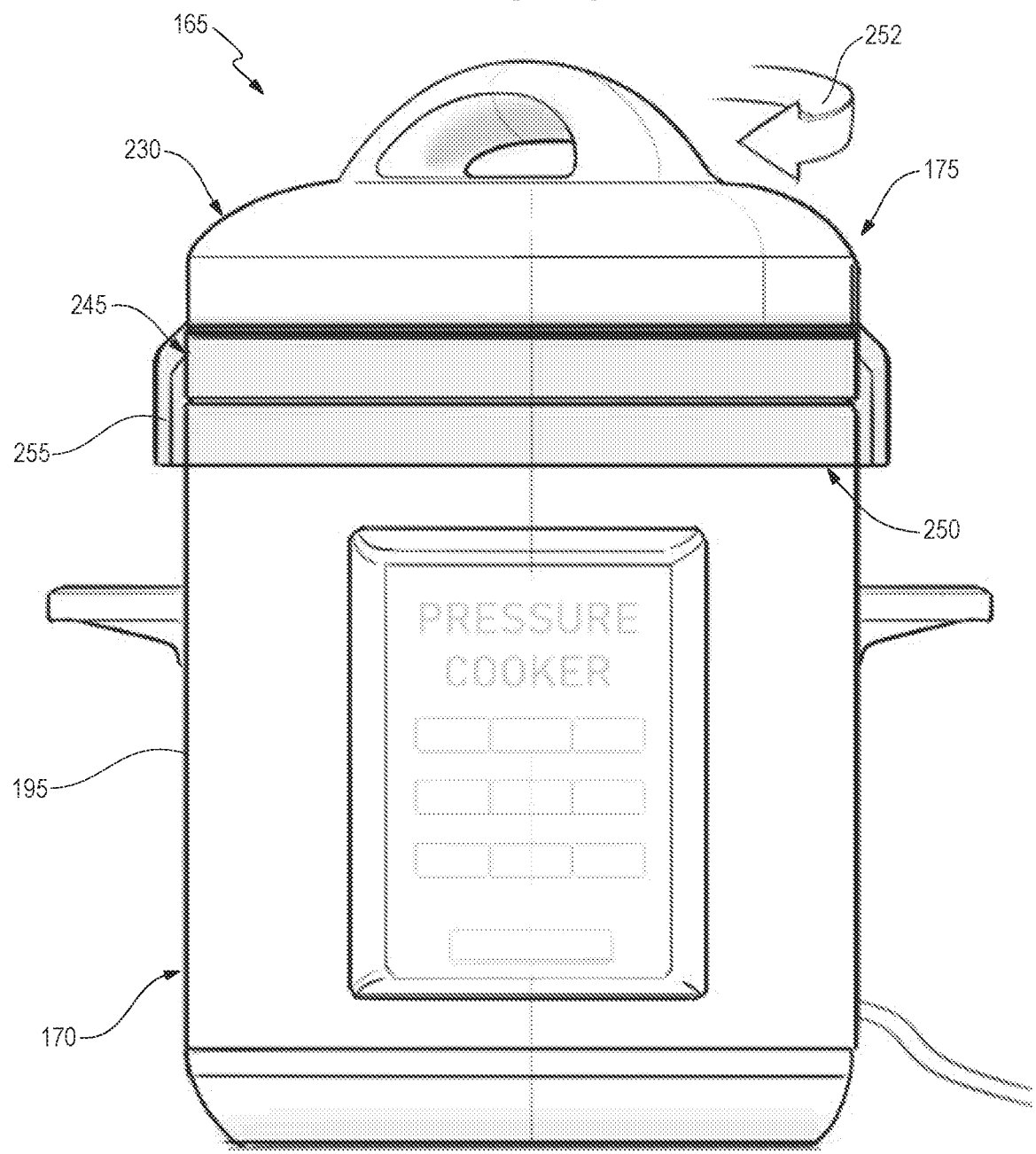
FIG. 10 is a front elevation view of the lid and vessel of FIG. 9 with the lid in a first closed position.

When the vessel 170 and lid 175 are in a first closed position, as illustrated in FIG. 10, the appliance 165 may be used as a pressure cooker. To use the appliance 165 as a pressure cooker, a second lid end 250 of the lid 175 may be placed onto the vessel 170. Then, the lid 175 may be turned in a first direction 252 to selectively engage the lid 175 and vessel 170. The first direction 252 may be clockwise. However, in alternative embodiments, the first direction 252 may be counter-clockwise.

When the lid 175 and vessel 170 are fully engaged in the first closed position, the lid 175 and the vessel 170 may lock and establish an airtight seal so that pressure may accumulate within the central cavity of the vessel 170. For example, the second lid section 245 may extend over the neck portion 210 (see FIG. 9) of the vessel 170. Furthermore, the first set of threads 215 (see FIG. 9) on the vessel 170 may engage with the second set of the threads (not shown) on the lid 175 in the first direction 252. Additionally, a skirt 255 on the lid 175 may extend over a portion of the vessel sidewall 195. The skirt 255 may be a portion of the lid 175 that projects away and extends downward from the first lid section 230 towards the second lid end 250. Additionally, the skirt 255 may extend radially outwards before extending vertically downwards. Thus, in the first closed position, the vessel 170 and the lid 175 may engage to seal the central cavity of the vessel 170 from the ambient environment. In alternative embodiments, the lid 175 and the vessel 170 may further or instead lock as known in the art so that pressure may accumulate within the central cavity of the vessel 170.

Figure 11:
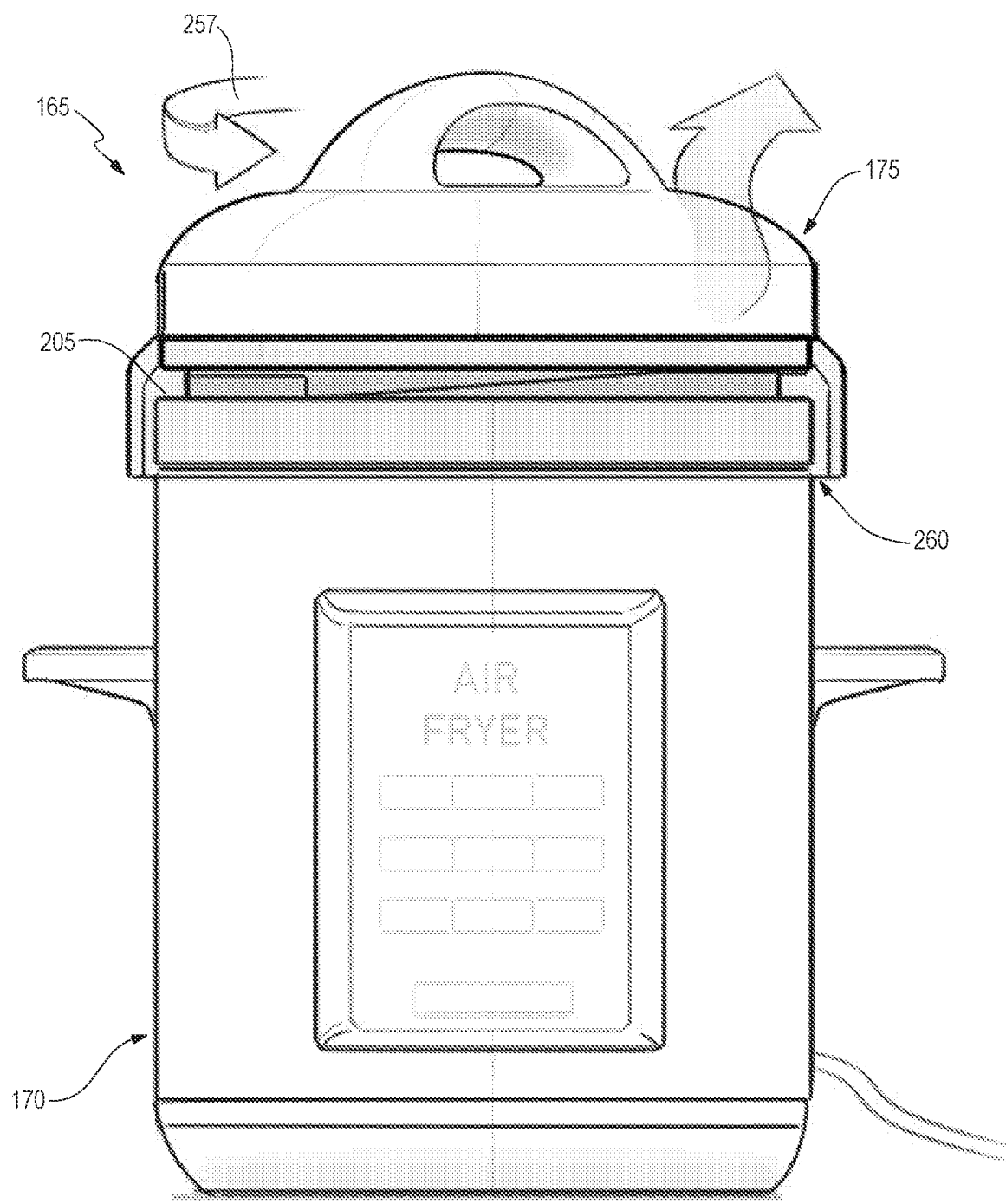
FIG. 11 is a front elevation view of the lid and vessel of FIGS. 9 and 10 with the lid in a second closed position.

Turning to FIG. 11, the appliance 165 may be used as an air fryer when the vessel 170 and lid 175 are in a second closed position. To use the appliance 165 as an air fryer, the lid 175 and vessel 170 may be selectively engaged by rotating the lid 175 in a second direction 257. The second direction 257 may be the opposite direction of the first direction 252. In one embodiment, the second direction 257 may be counter-clockwise, but in alternative embodiments, the second direction 257 may be clockwise.

When the lid 175 is rotated in the second direction 257, the lid 175 preferably rotates such that the first set threads 215 (see FIG. 9) engages with the second set of threads (not shown) in the second direction 257. As illustrated in FIG. 11, rotation of the lid 175 in the second direction 257 may further result in the lid 175 translating away from the shoulder portion 205 to define an air gap 260 between the lid 175 and the vessel 170. The air gap 260 may be a slot that preferably establishes fluid communication between the central cavity and the surroundings. Accordingly, when the lid 175 is in the second closed position, fluid communication may be provided between the central cavity and the ambient environment to facilitate air frying.

Figure 12:
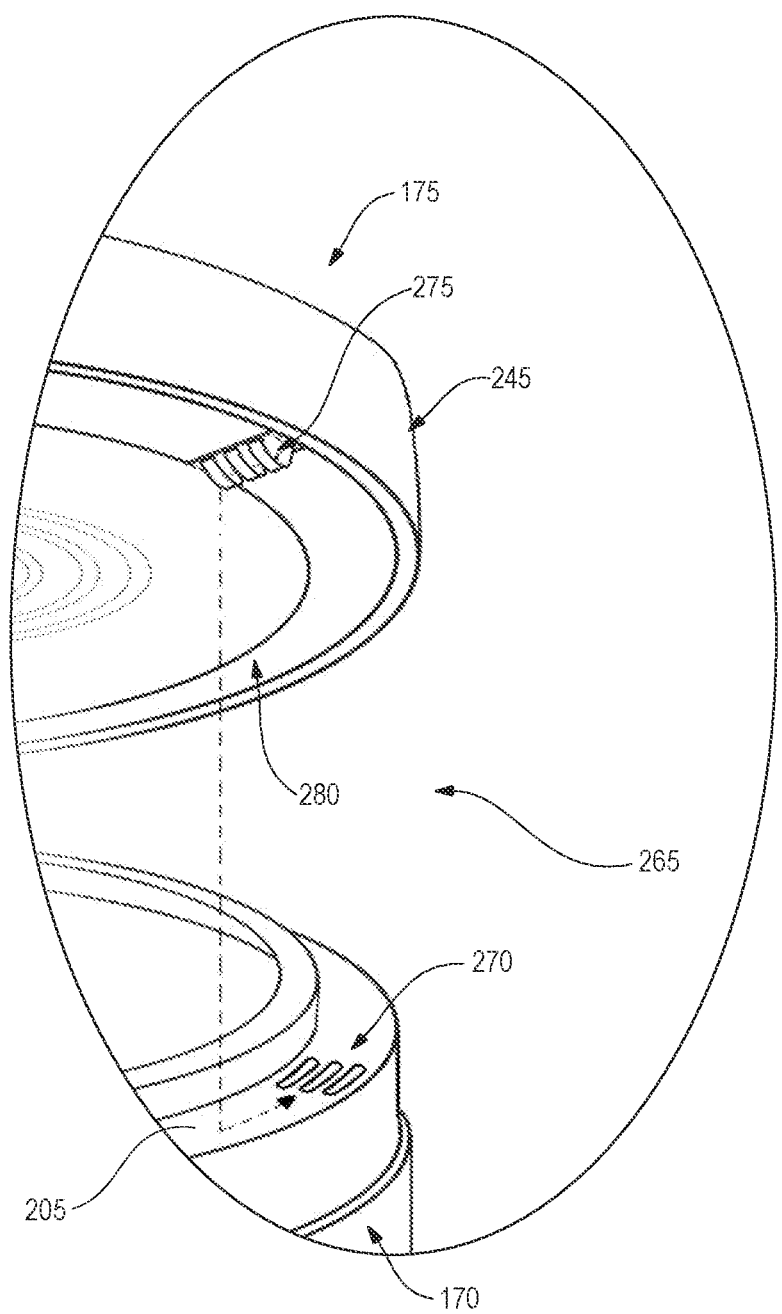
FIG. 12 is an enlarged perspective view of the lid and vessel of FIGS. 9-11 with the lid in an open position.

As illustrated in FIG. 12, an example electrical connection mechanism 265 may include at least one vessel electrical contact 270 and at least one lid electrical contact 275. The at least one vessel electrical contact 270 and the at least one lid electrical contact 275 may be positioned to selectively engage with one another when the lid 175 is in the second closed position relative to the vessel 170. For example, the at least one vessel electrical contact 270 may be positioned and located on the shoulder portion 205 of the vessel 170, and the at least one lid electrical contact 275 may be positioned and located on a second lid section rim 280 of the second lid section 245. In particular, the electrical contacts 270, 275 may be positioned relative to one another such that the at least one vessel electrical contact 270 aligns with or abuts the at least one lid electrical contact 275 when the lid 175 is rotated in the second direction 257 (see FIG. 11). However, when the lid 175 is rotated in the first direction 252 (see FIG. 10) or placed in any position other than the first closed position, the electrical contacts 270, 275 may not align, abut, or engage with one another.

The lid 175 may include a motor (not illustrated), a fan (not illustrated), and a heating element (not illustrated) in electrical communication with the at least one lid electrical contact 275. The at least one vessel electrical contact 270 may be configured to be in electrical communication with an electrical wall socket (e.g., a 120 V electrical receptacle) (not illustrated). Accordingly, when the at least one lid electrical contact 275 engages with the at least one vessel electrical contact 270, the motor, fan, and heating element may receive electricity from an electrical wall socket. Because the electrical contacts 270, 275 only engage with one another in the second closed position, the electrical connection mechanism 265 may help prevent electricity from flowing to the motor, fan, and heating element when the lid 175 is not in the second closed position. Accordingly, the electrical connection mechanism 265 may act as a safety mechanism to preferably activate the motor, fan, and heating element only when the lid 175 is engaged to the vessel 170 and in the second closed position.

In alternative embodiments, the direction of lid rotation to use the appliance 165 as a pressure cooker or air fryer may be switched, and/or different threads or mechanisms may be used to place the lid 175 into the first or second closed positions. Moreover, in other embodiments, the vessel 170 and the lid 175 may be further or instead configured to carry out conductive cooking operations other than pressure cooking (e.g., slow cooking, rice cooking).

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An appliance capable of conductive cooking and air frying with a single lid, the appliance comprising:
   a lid having a first position and a second position;
   at least one lid electrical contact positioned and located on the lid;
   a vessel including a central cavity, the vessel selectively engageable with the lid;
   at least one vessel electrical contact positioned and located on the vessel; and
   a controller configured to control operation of the appliance for conductive cooking when the lid is in the first position, and configured to control operation of the appliance for air frying when the lid is in the second position;
   wherein the at least one vessel electrical contact and the at least one lid electrical contact establish an electrical communication from the vessel to the lid when the vessel and the lid are engaged and positioned such that the at least one vessel electrical contact and the at least one lid electrical contact engage one another;
   wherein when the lid is in the first position, the central cavity is sealed from the ambient environment and the at least one lid electrical contact does not engage the at least one vessel electrical contract; and
   wherein when the lid is in the second position, fluid communication is established between the ambient environment and the central cavity and the at least one lid electrical contact engages the at least one vessel electrical contact.

2. The appliance of claim 1, wherein when the lid is rotated, the lid transitions to the first position or the second position.

3. The appliance of claim 1 further comprising a handle positioned and located on the lid, wherein when the handle is rotated in a first direction, the lid is placed in the first position, wherein when the handle is rotated in a second direction, the lid is placed in the second position, and wherein the first direction is opposite from the second direction.

4. The appliance of claim 1 further comprising:
   a first set of threads positioned and located on the vessel;
   a second set of threads positioned and located on the lid;
   wherein the first set of threads and the second set of threads engage in a first direction when the lid is in the first position; and
   wherein the first set of threads and the second set of threads engage in a second direction, opposite the first direction, when the lid is in the second position.

5. The appliance of claim 1, wherein when the lid is any position other than the second position, the at least one lid electrical contact does not engage the at least one vessel electrical contact.

6. The appliance of claim 1, wherein:
   the lid includes a heating element and a fan;
   the at least one lid electrical contact is in electrical communication with the heating element and the fan; and
   the at least one vessel electrical contact engages the at least one lid electrical contact only when the lid is engaged with the vessel and in the second position.

7. A lid capable of conductive cooking and air frying when engaged with a vessel, the vessel including a vessel electrical contact, the lid comprising:
   a heating element;
   a fan;
   at least one lid electrical contact in electrical communication with at least one of the heating element and the fan;
   wherein the lid has a first position and a second position;
   wherein when the lid is in the first position, the lid is configured for conductive cooking;
   wherein when the lid is in the second position, the lid is configured for air frying;
   wherein the at least one lid electrical contact is configured to selectively establish electrical communication via the vessel electrical contact from the vessel to the at least one of the heating element or the fan when the lid is in the second position;
   wherein the at least one lid electrical contact does not establish electrical communication via the vessel electrical contact when the lid is in the first position; and
   wherein, when the lid is engaged with the vessel, the lid is in communication with a controller, the controller being configured to control operation of the lid for conductive cooking when the lid is in the first position and to control operating of the lid for air frying when the lid is in the second position.

8. The lid of claim 7, wherein when a handle positioned and located on the lid is rotated, the lid transitions from the first position to the second position.

9. The lid of claim 7, wherein when the lid is rotated in a first direction, the lid is placed in the first position, wherein when the lid is rotated in a second direction, the lid is placed in the second position, and wherein the first direction is opposite from the second direction.

10. The lid of claim 7, wherein the lid is sized and shaped to selectively engage with the vessel.

11. The lid of claim 7 further comprising threads positioned and located on an inner surface of the lid, wherein the threads engage in a first direction when the lid is in the first position, and wherein the threads engage in a second direction when the lid is in the second position.

12. The lid of claim 7 further comprising:
a handle positioned and located proximate a first lid end;
threads positioned and located proximate a second lid end, opposite the first lid end; and
wherein the at least one lid electrical contact is positioned and located proximate the second lid end.

13. The lid of claim 7, wherein the at least one lid electrical contact engages the vessel electrical contact only when the lid is in the second position.

14. An appliance capable of conductive cooking and air frying with a single lid, the appliance comprising:
a lid having an air frying position and a conductive cooking position, the lid including:
a heating element;
a fan; and
at least one lid electrical contact in electrical communication with the heating element and the fan;
a vessel selectively engageable with the lid, the vessel including:
at least one vessel electrical contact positioned and located on the vessel; and
a central cavity; and
a controller configured to control operation of the appliance for conductive cooking when the lid is in the conductive cooking position, and configured to control operation of the appliance for air frying when the lid is in the air frying position;
wherein when the lid is engaged with the vessel and in the air frying position, fluid communication is established between the central cavity and the ambient environment and the at least one lid electrical contact aligns with the at least one vessel electrical contact to establish electrical communication between the vessel and at least one of the heating element or the fan; and
wherein when the lid is engaged with the vessel and in the conductive cooking position, the at least one vessel electrical contact is not aligned with the at least one lid electrical contact.

15. The appliance of claim 14, wherein when the lid is any position other than the air frying position, the at least one vessel electrical contact is not aligned with the at least one lid electrical contact.

16. The appliance of claim 14, wherein when the lid is engaged to the vessel and in the conductive cooking position, the lid and the vessel define an airtight seal with respect to the ambient environment.

17. The appliance of claim 14, wherein the at least one vessel electrical contact includes a plurality of vessel electrical contacts.

18. The appliance of claim 14, wherein the at least one vessel electrical contact is configured to be in electrical communication with a wall socket.

19. The appliance of claim 14, wherein when the lid is rotated, the lid transitions to the air frying position or the conductive cooking position.

20. The appliance of claim 14, wherein the lid and the vessel each include threads for selectively engaging with one another.

* * * * *